United States Patent [19]

Brandstetter et al.

[11] 4,442,263

[45] Apr. 10, 1984

[54] THERMOPLASTIC MOLDING MATERIALS

[75] Inventors: Franz Brandstetter, Neustadt; Juergen Hambrecht, Heidelberg; Rudolf Stephan, Ludwigshafen; Heinz-Juergen Overhoff, Frankenthal; Josef Schwaab, Maikammer; Claus Bernhard, Eisenberg; Johann Swoboda; Adolf Echte, both of Ludwigshafen, all of Fed. Rep. of Germany

[73] Assignee: BASF Aktiengesellschaft, Fed. Rep. of Germany

[21] Appl. No.: 398,822

[22] Filed: Jul. 16, 1982

[30] Foreign Application Priority Data

Jul. 25, 1981 [DE] Fed. Rep. of Germany ....... 3129472

[51] Int. Cl.$^3$ .................... C08L 51/04; C08L 51/06
[52] U.S. Cl. ......................... 525/83; 525/85; 525/302; 525/307
[58] Field of Search ............ 525/85, 302, 83, 307

[56] References Cited

U.S. PATENT DOCUMENTS 3,041,307  6/1962  Baer ........................... 525/85
3,691,260  9/1972  Mittnacht et al. ............ 260/876 R
4,224,419  9/1980  Swoboda et al. .............. 525/71
4,384,077  5/1983  Gift ............................ 525/85

Primary Examiner—Allan Lieberman
Attorney, Agent, or Firm—Keil & Witherspoon

[57] ABSTRACT

Thermoplastic molding materials contain a copolymer A and a graft copolymer B. The copolymer A is a hard component comprising one or more copolymers of styrene and/or α-methylstyrene with from 20 to 40% by weight of acrylonitrile.

The graft copolymer B comprises one or more cross-linked acrylate polymer with a mean particle size of 0.5–0.8 μm ($d_{50}$ value of the cumulative mass distribution), a particle distribution, expressed by the ratio $$Q = \frac{d_{90} - d_{10}}{d_{50}},$$

in the range $Q \geq 0.6$, and a glass transition temperature Tg below 0° C. A mixture of styrene and acrylonitrile in a weight ratio from 88:12 to 65:35 is grafted onto this rubber.

2 Claims, No Drawings

THERMOPLASTIC MOLDING MATERIALS

The present invention relates to an impact-resistant thermoplastic molding material comprising a blend of a styrene/acrylonitrile copolymer and a graft copolymer of styrene/acrylonitrile onto a polyacrylate.

The relevant prior art includes:
(1) British Pat. No. 1,124,911
(2) U.S. Pat. No. 3,691,260 and
(3) U.S. Pat. No. 4,224,419.

The production of impact-resistant thermoplastic materials by mixing a hard component A, comprising a copolymer of styrene and acrylonitrile, with a soft component B, comprising a graft copolymer of a styrene/acrylonitrile mixture onto a polyacrylate, has been disclosed in (1). Such molding materials are also referred to as ASA polymers.

The polyacrylate employed as the base polymer is prepared by emulsion copolymerization of acrylates of alkanols of 4 to 8 carbon atoms with tricyclodecenyl acrylate, and the resulting latex particles have a diameter of $\geq 0.1$ μm. The subsequent graft copolymerization is preferably carried out in emulsion, a styrene/acrylonitrile mixture being grafted onto the polyacrylate which constitutes the base polymer latex.

The molding materials thus produced have a greater rigidity and strength than similar molding materials which contain a polyacrylate as the base polymer but do not contain tricyclodecenyl alcohol as the alcohol component, and exhibit improved aging resistance in comparison with impact-resistant molding materials containing a polydiene as the base polymer in the soft component, ie. ABS molding materials.

(2) discloses molding materials which possess, as the soft component B, a graft copolymer of an acrylate of an alcohol of 4 to 8 carbon atoms with styrene/acrylonitrile, having a mean particle diameter of from 0.15 to 0.8 μm and a narrow particle size distribution.

Thermoplastic molding materials having a broad particle size distribution in the range from 0.050 to 0.5 μm are described in (3). Although these molding materials exhibit improved aging resistance, colorability and viscosity, their aging resistance and, in particular, their flow characteristics are frequently inadequate.

It is an object of the present invention to provide thermoplastic molding materials having good aging resistance and improved flow characteristics.

We have found that this object is achieved by molding materials as claimed in claim 1.

The composition of the novel molding material comprising components A and B, and the preparation of the components and of the molding material, are described below:

Component A:

The novel molding material contains from 50 to 90% by weight, preferably from 55 to 80% by weight, based on the sum A+B, of component A. The residual proportion constitutes component B.

The component (A) present in the novel blend is a hard component comprising one or more copolymers of styrene and/or α-methylstyrene with acrylonitrile. The acrylonitrile content of these copolymers should be from 20 to 40% by weight, based on the particular copolymer. These hard components (A) also include, as described below, the free, non-grafted styrene/acrylonitrile copolymers formed in the graft copolymerization for the preparation of component (B). Depending on the conditions chosen for this graft copolymerization, it may be possible for a sufficient amount of the hard component (A) to be formed even at this stage. In general, however, it will be necessary to mix the graft copolymer with additional, separately prepared hard component (A).

The separately prepared hard component (A) may be a styrene/acrylonitrile copolymer, an α-methylstyrene/acrylonitrile copolymer or an α-methylstyrene/styrene/acrylonitrile terpolymer. These copolymers may be employed individually or as a mixture in the hard component (A), so that this component of the novel blend may, for example, be a mixture of a styrene/acrylonitrile copolymer with an α-methylstyrene/acrylonitrile copolymer. In this particular case, the acrylonitrile contents of the two copolymers should differ by no more than 10% by weight, preferably no more than 5% by weight, based on the copolymer. However, it is also possible for the hard component (A) of the novel molding material to comprise only a single styrene/acrylonitrile copolymer, ie. when the same mixture of styrene and acrylontrile monomers is employed in the graft copolymerization for the preparation of component (B) and in the preparation of the additional, separately prepared hard components.

The hard component (A) may be obtained by the conventional methods. Thus, the copolymerization of the styrene and/or α-methylstyrene with the acrylonitrile may be carried out in bulk, solution, suspension or aqueous emulsion. The hard component (A) preferably has an intrinsic viscosity of from 40 to 100, in particular from 50 to 85 [ml/g].

Component B:

The graft copolymer (B) employed according to the invention is prepared in two stages. First, the grafting base ($B_1$), a latex, is prepared. Suitable alkyl acrylates for this purpose are those which produce acrylate polymers with a glass transition temperature Tg below 0° C., preferably below $-20°$ C., in particular below $-30°$ C. This temperature can be determined, for example, by the DSC method (K. H. Illers, Makromol. Chemie 127 (1969), 1). Alkyl acrylates where alkyl is of 2 to 8, preferably of 4 to 8, carbon atoms, are particularly suitable for the preparation of the acrylate polymers, and n-butyl acrylate and ethylhexyl acrylate are very particularly suitable. The acrylates may be employed alone or as a mixture.

It is possible to replace some or all of the alkyl acrylates by one or more comonomers, such as styrene vinyl chloride, alkyl methacrylates or acrylonitrile. The proportion of comonomers should be from 1 to 40% by weight, preferably from 5 to 30% by weight, based on the monomer or monomers.

In addition, conventional crosslinking monomers having two or more functional groups are employed. For this purpose the polymerization of the acrylate, and, where relevant, of the comonomers, may be carried out in the presence of from 0.5 to 10% by weight, preferably from 1 to 5% by weight, based on the total amount of monomers and comonomers, of one or more crosslinking monomers. Suitable bifunctional or polyfunctional crosslinking monomers of this type are those which possess preferably two, of if required even more, ethylenic double bonds capable of copolymerization. Examples of suitable crosslinking monomers are divinylbenzene and diallyl maleate, and tricyclodecenyl acrylate has proved particularly advantageous (cf. German Pat. No. 1,260,135). The polymerization is carried out in the presence of one or more water-insoluble organic initiators, particularly suitable ones being diacyl peroxides and peresters. Examples of these are acetylcyclohexanesulfonyl peroxide, peroxydicarbonate, eg. diisopropyl peroxydicarbonate, t-amyl perneodecanoate, t-butyl perneodecanoate, bis-(2,4-dichlorobenzoyl)-peroxide, t-butyl perpivalate, bis(3,5,5-trimethylhexanoyl)peroxide, bis-(o-toluoyl)peroxide, didecanoyl peroxide, dioctanoyl peroxide, dilauroyl peroxide, succinyl peroxide, diacetyl peroxide, dibenzoyl peroxide, t-butyl per-2-ethylhexanoate, bis-(4-chlorobenzoyl)-peroxide, t-butyl perisobutyrate, t-butyl permaleate, 1,1-di-(t-butylperoxy)-3,5,5-trimethylcyclohexane, 1,1-di-(t-butylperoxy)-cyclohexane, t-butyl peroxy-isopropylcarbonate, t-butylperoxy-3,5,5-trimethylhexanol, 2,5-dibenzoylperoxy-2,5-dimethylhexane, t-butyl peracetate, t-butyl perbenzoate, 2,2-bis-(t-butylperoxy)butane, 2,2-bis-(t-butylperoxy)-propane, dicumyl peroxide, 3-t-butylperoxy-3-phenylphthalide, 2,5-dibutylperoxy-2,5-dimethylhexane, α,α'-di-(t-butylperoxy)-isopropylbenzene, di-t-butyl peroxide and 2,5-(di-t-butylperoxy)-2,5-dimethylhex-3-yne.

Acetylcyclohexanesulfonyl peroxide, t-butyl perneodecanoate, t-butyl perpivalate, dilauroyl peroxide and dibenzoyl peroxide are preferred. However, it is also possible to use combinations of different initiators, such as t-butyl perneodecanoate with t-butyl perpivalate, or acetylcyclohexanesulfonyl peroxide with dilauroyl peroxide.

The initiators are employed in amounts of from 0.01 to 0.9, preferably from 0.03 to 0.3, % by weight, based on the monomer or monomers. It is possible to introduce initially into the reaction vessel either the total amount of initiator or only a part thereof (as a rule from 1/6th to 1/3rd).

However, the initiator is preferably metered in stages into the reaction solution, and for this purpose it is employed either dissolved in an inert solvent or in the form of a microsuspension.

The conventional, preferably anionic emulsifiers may be used, such as alkali metal salts of alkylsulfonic acids or arylsulfonic acids, alkyl sulfates, fatty alcohol sulfonates, salts of fatty acids of 10 to 30 carbon atoms or resin soaps. Alkyl sulfates are preferred, and Na dodecyl sulfate and $C_{12}$–$C_{18}$-alkyl sulfates are very particularly suitable. The emulsifier is employed in an amount of from 0.1 to 5, preferably from 0.6 to 2, % by weight, based on the monomer or monomers.

Suitable long-chain alcohols are aliphatic alcohols of 10 to 30 carbon atoms, for example lauryl alcohol, cetyl alcohol, oleyl alcohol and stearyl alcohol. The alcohol is employed in an amount of from 0.1 to 3, preferably from 0.2 to 2, % by weight, based on the monomer or monomers.

The polymerization is carried out under conventional conditions of pressure and temperature, preferably at 30°–90° C. Conventional ratios of water:monomer in the range from 4:1 to 2:3 are used.

To carry out the polymerization, a mixture of water, the emulsifier and the long-chain alcohol is first prepared, and is stirred for from 5 to 30 minutes at above the melting point of the alcohol. Thereafter, the mixture is brought, if necessary, to the desired polymerization temperature, and the polymerization is begun immediately, ie. without additional homogenization beforehand. The polymerization may preferably be carried out, for example, by initially introducing the total amount of monomer or monomers, with or without a proportion (for example from 1/6th to a maximum of 50% by weight) of the initiator, into the above mixture and metering in the remainder of the initiator or the total amount, as appropriate, in solution or in microsuspension, after the polymerization has begun, in order to obtain a continuous polymerization. On the other hand, it is also possible to introduce initially the total amount of initiator and only a part of the monomer or monomers, and to meter in the remaining amount of monomer. Furthermore, it is possible to introduce initially the total amount of initiator and to run in the total amount of monomer or monomers. An equally successful procedure comprises initially introducing a part of the monomer or monomers and a part or all of the initiator. In this manner, it is possible to carry out a controlled polymerization reaction, without homogenization of the monomer or monomers beforehand, the reaction being complete in from 1 to 10 hours, depending on the cooling capacity, and quantitative conversion of the monomer or monomers being achieved. This procedure gives latex particles with a mean particle diameter ($d_{50}$ value) of $\geq 0.5$ μm.

The mean particle diameter of the grafting base in the novel molding materials should be $\geq 0.5$ μm, preferably 0.6–0.8 μm. The distribution of the diameters of the particles is defined by $$Q = \frac{d_{90} - d_{10}}{d_{50}}$$

For component $B_1$, Q should be equal to or larger than 0.6, in particular from 0.7 to 1.5.

To prepare the graft copolymer (B) from (B1), a mixture of styrene and acrylonitrile is polymerized, in a second step, in the presence of the acrylate polymer latex thus obtained, the weight ratio of styrene and acrylonitrile in the monomer mixture being from 88:12 to 65:35, preferably 70:30. This graft copolymerization of styrene and acrylonitrile onto the acrylate polymer serving as the grafting base is advantageously carried out in aqueous emulsion under the conventional conditions described above, and in the same system in which the grafting base (B1) has been prepared by polymerization, further emulsifier, long-chain alcohol and initiator being added if necessary. The grafting mixture of styrene and acrylonitrile monomers can be added to the reaction mixture as a single shot, a little at a time or, preferably, continuously during the polymerization. The graft copolymerization of the styrene/acrylonitrile mixture in the presence of the acrylate polymer is conducted so as to obtain a graft copolymer (B) in which the degree of grafting is from 20 to 60% by weight, preferably from 40 to 50% by weight. Since the grafting yield in such a reaction is not 100%, a somewhat larger amount of the styrene/acrylonitrile monomer mixture has to be employed than corresponds to the desired degree of grafting. The means of control of the grafing yield in a graft copolymerization, and hence of the degree of grafting in the graft copolymer (B) produced, are familiar to a skilled worker and include, for example, controlling the rate of addition of the monomers or of the regulator (cf. Chauvel and Daniel, ACS Polymer Preprints 15 (1974), 329 et seq.). In general, from about 5 to 15% by weight, based on the graft copolymer, of free, non-grafted styrene/acrylonitrile copolymer are produced during the emulsion graft copolymerization. The amount of graft copolymer (B) in the product obtained from the graft copolymerization is determined by the method described below. Preparation of the novel molding material:

Components (A) and (B) may be mixed by any conventional method. If, for example, the components have been prepared by emulsion polymerization, it is, for example, possible to mix the resulting polymer dispersions with one another, after which the polymers are co-precipitated and the polymer mixture is worked up. Preferably, however, components (A) and (B) are mixed by coextrusion, or by kneading or milling the components with one another, the components being isolated beforehand, if necessary, from the solution or aqueous dispersion obtained in the polymerization. Component (B), which is produced in aqueous dispersion, may also be only partially dried and then mixed, as moist crumb, with the hard component (A), during which mixing the final drying of the graft copolymer occurs.

The novel blends of components (A) and (B) may contain, as a further component (C), any conventional additives and/or assistants employed in ABS and ASA polymers. Examples of such additives and/or assistants are fillers, additional and compatible plastics, dyes, pigments, antistatic agents, antioxidants, flameproofing agents and lubricants. The additives and assistants are employed in the conventional effective amounts, which are preferably from 0.1 to about 30% by weight, based on the mixture (A+B).

Examples of suitable antistatic agents are polyethylene glycols, polypropylene glycols and in particular ethylene oxide/propylene oxide copolymers. Salts of alkylsulfonic acids or of alkylarylsulfonic acids, or oxyethylated long-chain alkylamines, may also be used as antistatic agents.

The novel molding materials may be processed by a conventional method for thermoplastics, for example extrusion or injection molding, to give a great diversity of moldings, eg. housings for household appliances, telephones, sheets, pipes and toys. The novel molding materials are particularly suitable for the production of colored moldings of the stated type, such colored articles being used particularly for housings for electrical appliances, for toys and in furniture.

The parameters referred to in the present application were determined as follows:

1. The mean particle size according to the present invention is in each case the weight average of the particle sizes, as determined by means of an analytical ultracentrifuge, using the method of W. Scholtan and H. Lange, Kolloid-Z. und Z.-Polymere 250 (1972), 782–796. The ultracentrifuge measurement gives the cumulative mass distribution of the particle diameters in a sample. From these measurements it is possible to obtain the percentage by weight of particles having a diameter equal to or smaller than a particular value. The mean particle diameter, also referred to as the $d_{50}$ value of the cumulative mass distribution, is defined as the particle diameter which is greater than that of 50% by weight of the particles and smaller than that of the other 50% by weight. The width of the particle size distribution of the rubber particles is calculated from the $d_{10}$, $d_{90}$ and $d_{50}$ values, the latter being the mean particle diameter. The $d_{10}$ and $d_{90}$ values of the cumulative mass distribution are defined similarly to the $d_{50}$ value except that they relate to 10 and 90% by weight, respectively, of the particles. The ratio $$\frac{d_{90} - d_{10}}{d_{50}} = Q$$

is a measure of the width of the particle size distribution.

2. The grafting yield and hence the proportion of the graft copolymer in the product obtained from the graft copolymerization reaction are determined by extracting the polymer with methyl ethyl ketone at 25° C. The degree of polymerization of the graft copolymer, ie. the percentage of grafted styrene and acrylonitrile present in the graft copolymer, is most simply determined by elementary analysis of nitrogen (from acrylonitrile) and oxygen (from acrylate) in the gel which is insoluble in methyl ethyl ketone.

3. The impact strength of the molding material was determined, in accordance with DIN 53,453, on injection-molded standard small bars at 23° C. The bars were injection-molded at 250° C.

4. The flow (in g/10 min) was determined by measuring the melt index at 200° C. and 21.6 kp, in accordance with DIN 53,735.

5. The intrinsic viscosities were measured in a 0.5% strength solution in dimethylformamide, at 25° C. (DIN 53,726).

The following products were employed in carrying out the experiments described in the Examples and Comparative Experiments:

Hard component A

A mixture of styrene and acrylonitrile monomers was polymerized in solution, under conventional conditions. The styrene/acrylonitrile copolymer obtained contained 35% of acrylonitrile and had an intrinsic viscosity of 80 ml/g.

Graft copolymer B, type I:

12.0 kg of distilled water, 96 g of Na lauryl sulfate and 40 g of stearyl alcohol are stirred for 10 minutes at 65° C. in a 40 l stirred kettle equipped with an anchor stirrer. 1.3 kg of n-butyl acrylate and 4.5 g of t-butyl perneodecanoate are added. After the reaction has begun, 6.7 kg of n-butyl acrylate and 0.3 kg of tricyclodecenyl acrylate are introduced in the course of 2 hours, and four hours after the start of the reaction 2.2 g of t-butyl perneodecanoate in 100 ml of n-hexane are run in. The mean particle size of the resulting latex is 632 nm, the Q value $$\left( = \frac{d_{90} - d_{10}}{d_{50}} \right)$$

1.1, and the solids content is 37%. 4,280 g of the microsuspension, 2,987 g of distilled water, 3.86 g of t-butyl peroctoate and 22.5 g of Na lauryl sulfate are heated to 75° C. in a 10 l stirred vessel. A mixture of 482 g of styrene and 161 g of acrylonitrile is introduced continuously in the course of 4 hours. After the addition of the monomers is complete, the mixture is allowed to continue reacting for a further hour at 75° C. The graft copolymer is isolated by precipitation with a calcium chloride solution, and is separated off by centrifuging and dried under reduced pressure.

Graft copolymer B, type II:

12.0 kg of distilled water, 96 g of Na lauryl sulfate and 40 g of stearyl alcohol are stirred for 10 minutes at 65° C. in a 40 l stirred kettle equipped with an anchor stirrer. 8.0 kg of n-butyl acrylate, 0.32 kg of tricyclodecenyl acrylate and 4.5 g of t-butyl perneodecanoate are added in the course of 1 hour. A solution of 3 g of t-butyl perneodecanoate in 100 ml of n-hexane is metered in 5 hours after the beginning of the addition. The reaction is terminated when the product has a solids content of 36% by weight. The mean particle size is 756 nm and the Q value is 1.16. 4,280 kg of the microsuspension, 2,987 kg of distilled water, 2.89 g of t-butyl peroctoate and 22.5 g of Na lauryl sulfate are heated to 75° C. in a 10 l stirred vessel. A mixture of 482 g of styrene and 161 g of acrylonitrile is introduced continuously in the course of 4 hours. After the addition of the monomers is complete, the mixture is allowed to continue reacting for a further hour at 75° C. The graft copolymer is isolated by precipitation with a calcium chloride solution, and is separated off by centrifuging and dried under reduced pressure.

The Examples and Comparative Experiments which follow illustrate the invention. Parts and percentages therein are by weight, unless stated otherwise.

EXAMPLES 1 AND 2

The amounts of components A and B (type I and type II) given in the Table were mixed in an extruder at 250° C. The parameters listed in the Table were determined on extruded samples.

For comparison, the Table also gives the values obtained for molding materials A and B from the prior art reference (3). Experiment A corresponds to Example 1 and Experiment B to Example 3 of (1).

From a comparison of the results, it can be seen that the novel molding materials possess substantially improved aging resistance coupled with improved flow characteristics.

TABLE

| Examples | Component A [parts by weight] | Component B $d_{50}$ value [μm] | Q | [parts by weight] | Melt index at 200° C. [g/10 min] | Impact strength after weathering for 180 hours |
|---|---|---|---|---|---|---|
| 1 | 55 | Type I 0.632 | 1.1 | 45 | 3.5 | not broken |
| 2 | 55 | Type II 0.756 | 1.16 | 45 | 4.2 | not broken |
| Comparative Experiments | | | | | | |
| A | 55 | 0.17 | 1.2 | 45 | 2.5 | 36.2 |
| B | 55 | 0.263 | 0.87 | 45 | 3.2 | 87.3 |

We claim:
1. A thermoplastic molding material essentially containing
  (A) 50–90% by weight, based on A+B, of a hard component comprising one or more copolymers of styrene or α-methylstyrene, or of styrene and α-methylstyrene, with acrylonitrile, these copolymers containing from 20 to 40% by weight of acrylonitrile as copolymerized units, and
  (B) 50–10% by weight, based on A+B, of a graft copolymer comprising
  ($B_1$) 40–80% by weight, based on (B), of one or more crosslinked acrylate polymers having a mean particle size of not more than 0.8 μm ($d_{50}$ value of the cumulative mass distribution) and a glass transition temperature, Tg, below 0° C., onto which is grafted
  ($B_2$) 20–60% by weight, based on (B), of one or more mixtures of styrene and acrylonitrile in a weight ratio from 88:12 to 65:35,
wherein the mean particle size of the grafting base ($B_1$) is >0.5 μm and the particle distribution, expressed by the ratio

$$Q = \frac{d_{90} - d_{10}}{d_{50}},$$

is ≧0.6.

2. A molding which has been produced by shaping the material described in claim 1.

* * * * *